May 8, 1956     F. E. STEELE     2,744,761

WHEELBARROW WITH SPRING MOUNTED WHEEL

Filed Sept. 24, 1953

Frank E. Steele
INVENTOR.

2,744,761

WHEELBARROW WITH SPRING MOUNTED WHEEL

Frank E. Steele, Mercer, Pa.

Application September 24, 1953, Serial No. 382,039

1 Claim. (Cl. 280—47.22)

This invention relates in general to improvements in wheelbarrows and more specifically to an improved wheel suspension for wheelbarrows.

In the average wheelbarrow construction the single wheel thereof is placed well in advance of the body portion so that a load may be properly balanced and the wheelbarrow will handle properly. However, inasmuch as the wheel is normally placed in advance of the load and is of relatively small diameter it is quite difficult to move the wheelbarrow over curbs or other similar obstacles. It is therefore the primary object of this invention to provide an improved wheel mounting means for wheelbarrows which will permit the wheel to move upwardly and slightly rearwardly in some cases so that the wheelbarrow may be conveniently moved over towards other obstacles.

Another object of this invention is to provide an improved wheel suspension for wheelbarrows which includes spring means for urging the wheel to a normal lower position, the spring means being provided with suitable adjustment means whereby the effectiveness thereof may be varied in accordance with the load placed upon the wheelbarrow.

A further object of this invention is to provide an improved wheelbarrow construction which includes a wheel having its point of support well in advance of the load of the wheelbarrow but which is positioned rearwardly of its point of support whereby the same is properly positioned for movement over curves or other similar obstacles.

All of the foregoing and still further objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
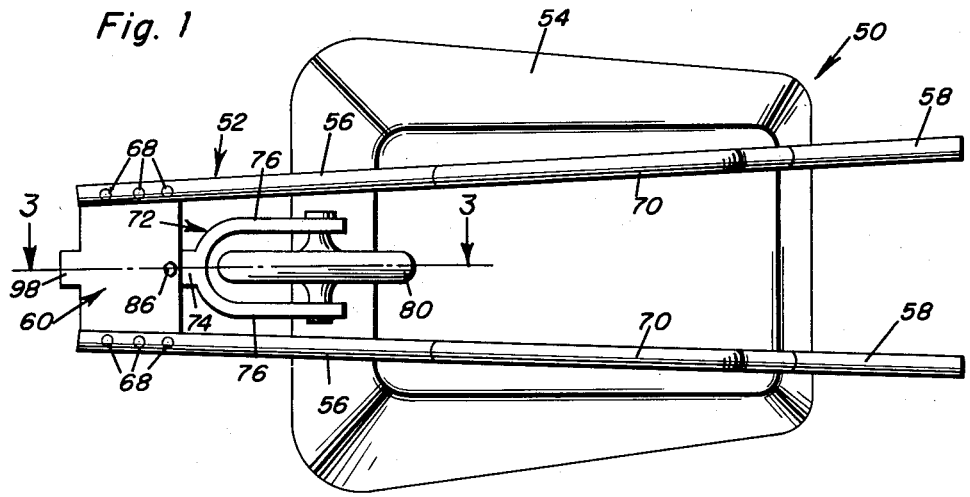
Figure 1 is a bottom plan view of a modified form of wheelbarrow and shows the general arrangement of the wheel suspension means therefor.
Figure 2:
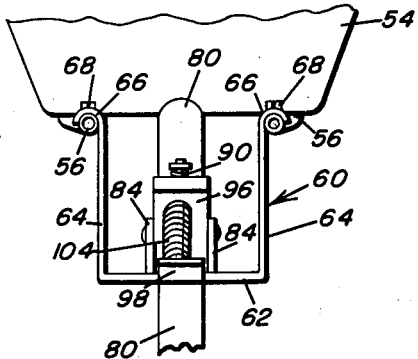
Figure 2 is an enlarged fragmentary front elevational view of the wheelbarrow of Figure 1 and shows the general cross section of the front cross frame member.
Figure 3:
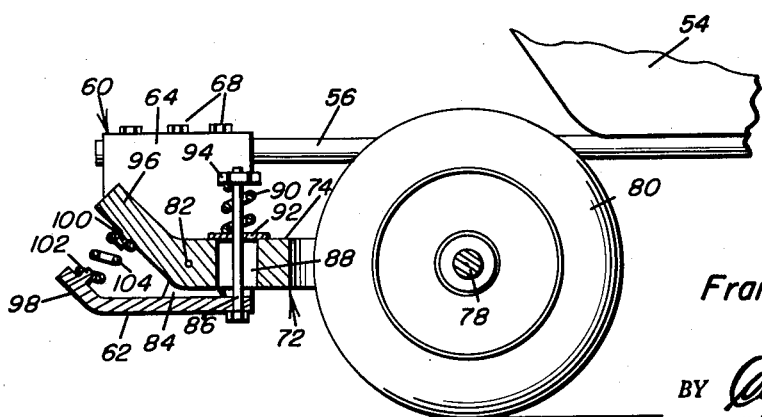
Figure 3 is an enlarged fragmentary sectional view taken substantially upon the plane indicated by the section line 3—3 of Figure 2, the view being rotated and showing the exact suspension means for the wheel.

Referring now to the drawings, it will be seen that there is illustrated a wheelbarrow which is referred to in general by the reference numeral 50. The wheelbarrow 50 includes a supporting frame which is referred to in general by the reference numeral 52. Carried by the supporting frame 52 is a suitable body 54.

The supporting frame 52 includes a pair of longitudinally extending frame rails 56 which diverge rearwardly and which terminate in upwardly offset handles 58 at their rear ends. The forward ends of the frame rails 56 are connected together by a front cross frame member which is referred to in general by the reference numeral 60. The front cross frame member 60 includes a lower horizontal portion 62 which has extended upwardly from the outer edges thereof vertical portions 64. The vertical portions 64 terminate in outwardly rolled end portions 66 which overlie the forward ends of the frame rails 56 and which are secured thereto by fasteners 68. Further, the supporting frame 52 includes suitable feet 70 depending from the individual frame rails 56.

Carried by the cross frame members 60 is a fork which is referred to in general by the reference numeral 72. The fork 72 includes a rearwardly extending shank 74 which terminates in a pair of spaced parallel rearwardly extending arms 76. Extending transversely between the arms 76 is an axle 78 on which is mounted a wheel 80.

It will be noted that the shank 74 is pivotally mounted on a transversely extending pivot pin 82 which extends between a pair of upstanding ears 84 carried by the horizontal portion 62 of the cross frame member 60. It will thus be seen that the fork 72 is mounted for pivotal movement about the pivot pin 82. This permits the upward movement of the wheel 80 when it strikes an obstacle such as a curve.

In order that the upward movement of the wheel 80 may be resiliently resisted and the wheel 80 retained in a foremost position under normal circumstances, there is carried by the horizontal portion 62 an upstanding fastener 86. The fastener 86 passes through an elongated longitudinally extending slot 88 in the shank 74 and has mounted on the upper portion thereof a spring 90. The spring 90 has the lower end thereof bearing against an enlarged washer 92 which overlies the shank 84 and has its upper end depressly engaging an enlarged washer 92 restrained by the upper end of the fastener 86. It will be understood that the spring 90 is normally under compression and that it urges the wheel 80 to its lowermost position.

The shank 74 includes an upwardly and forwardly extending portion 96 which is in spaced parallel relation with an upwardly and forwardly extending tab 98 formed integrally with the horizontal portion 62. The portion 96 is provided with a downwardly and forwardly projecting lug 100 which is in alignment with an upwardly and rearwardly extending lug 102 on the tab 98. Extending between the portion 96 and the tab 98 and retained in position by the lugs 100 and 102 is a second depression spring 104. It will be seen that the compression spring 104 also urges the wheel 80 to its lowermost position.

The wheel 80 functions in a manner to absorb shocks transmitted to the wheelbarrow 50. Further, it permits the wheelbarrow 50 to be moved up over curbs and the like due to its upward movement when striking an obstacle. The effectiveness of the springs may be varied by adjusting the length of the fastener 86.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A wheelbarrow construction comprising a supporting frame, a body carried by said supporting frame, said supporting frame including a front cross frame member, a wheel, a fork pivotally connected to said cross frame member, said fork including a pair of rearwardly extending arms, an axle extending between rear ends of said arms, said wheel being mounted on said axle, spring means carried by said cross frame members for urging said wheel to a lowermost position, said front cross frame member having a flat central portion, a fastener carried by said central portion loosely passing vertically through said fork, said spring means including a spring carried by said fastener and urging said fork downwardly towards said central portion, said fork and said central portions having upwardly sloping forward parts, a second spring extending between said forward parts and resisting upward pivoting of said wheel about said fastener.

References Cited in the file of this patent

UNITED STATES PATENTS

| | | |
|---|---|---|
| 381,927 | Howard | May 1, 1888 |
| 1,951,477 | Gannett | Mar. 20, 1934 |
| 2,176,780 | Wood | Oct. 17, 1939 |
| 2,250,797 | Garlinghouse | July 29, 1941 |

FOREIGN PATENTS

| | | |
|---|---|---|
| 966,856 | France | Mar. 15, 1950 |
| 426,986 | Great Britain | Apr. 12, 1935 |
| 179,619 | Switzerland | Dec. 2, 1935 |